United States Patent [19]
Pavenick

[11] 3,936,159
[45] Feb. 3, 1976

[54] HEAT SHRUNK PLASTIC FILM MIRROR

[75] Inventor: Stanford Pavenick, South Orange, N.J.

[73] Assignee: New Age Mirror & Tile Industries, Newark, N.J.

[22] Filed: Mar. 15, 1974

[21] Appl. No.: 451,652

[52] U.S. Cl. ............................. 350/310; 350/288
[51] Int. Cl.² .......................................... G02B 5/08
[58] Field of Search .................. 350/288, 295, 310; 248/467; 160/378; 156/163, 85; 29/446, 238; 264/230; 40/152; 52/222

[56] References Cited
UNITED STATES PATENTS

| | | | |
|---|---|---|---|
| 1,632,236 | 6/1927 | Kirk-Schneider | 350/288 |
| 1,849,708 | 3/1932 | Colbert et al. | 350/288 |
| 2,952,189 | 9/1960 | Pajes | 350/295 |
| 3,552,835 | 1/1971 | Benzies | 350/288 |
| 3,733,116 | 5/1973 | Hutchinson | 350/288 |

FOREIGN PATENTS OR APPLICATIONS

| | | | |
|---|---|---|---|
| 1,133,367 | 11/1968 | United Kingdom | 350/310 |

*Primary Examiner*—Alfred E. Smith
*Assistant Examiner*—Jon W. Henry
*Attorney, Agent, or Firm*—Behr & Woodbridge

[57] ABSTRACT

A plastic film mirror is formed by attaching a highly reflective, metallized polyester film to a frame having a rigid base section and a resilient upper section capable of bending inwardly towards the interior of the mirror, and subjecting said film to an elevated temperature for a specific period of time to cause the film to shrink in at least one direction. The shrinking of the film urges the resilient upper section of the frame inwardly thereby causing said film to be maintained in a state of constant tension by the restoring tendency of the resilient upper section. The plastic film mirror may be further provided with a means for modifying the reflective characteristics of a portion of the mirror. The means preferably comprises a shallow dish located behind the mirror which when evacuated draws the reflective film inward and thereby causes a concave indentation. Conversely, a pressure greater than ambient atmospheric pressure may be applied to the shallow dish and a portion of the film will be caused to become convex.

20 Claims, 12 Drawing Figures

HEAT SHRUNK PLASTIC FILM MIRROR

BACKGROUND OF THE INVENTION

1. Field of the Invention

This invention relates to mirrors in general and in particular to a plastic film mirror produced by a heat shrinking process.

2. Description of the Prior Art

In recent years a substantial market has developed for mirrors for residential use, in addition to the traditional uses of mirrors on dressing tables, medicine cabinets and the like. Mirrors have become popular on closet doors, both of the opening and sliding variety and a market is developing for reflective ceiling and wall tiles, both having a decorated and undecorated reflective surface.

One of the disadvantages of glass mirrors is the problem of high breakage and weight. The solution to this problem requires expensive and heavy packaging, which adds to the already substantial freight costs involved in the long distance shipment of glass.

A second disadvantage, which is an esthetic one, is that the principal reflective surface of a traditional mirror is behind a layer of glass. Thus, the reflection of such mirrors is not as bright as would be possible if the reflective surface were on the front face of the mirror rather than the rear face. Due to problems of technology it has not generally been practical to place the reflective coating on the front surface of glass. Although, of course, this technique is employed in non-domestic applications such as astronomical telescopes and the like.

The discovery that a stable, smooth, reflective surface could be obtained by the vacuum deposition of certain metals upon certain plastic materials led to the use of such materials as mirrors. In order for such mirrors to be formed and to maintain good plainer reflective surfaces, it is necessary that the reflective surface be permanently under tension. A substantial amount of work has been done in this area and will be found in U.S. Pat. Nos. 3,434,181 and 3,552,835 to Benzies and U.S. Pat. Nos. 3,608,179 and 3,180,220 to Jeffree et al. A review of these patents will show that an essential component of these mirrors is a tensioning and tension-retaining means such as a vacuum pockets rigid or semirigid ring spring or similar device. The use of such devices complicates the structure of the mirror and increases their costs, both from the point of view of materials and from the point of view of structural complexity. It would be highly desirable, therefore, to provide a mirror which has the general properties of the Benzies and Jeffree mirrors, without the necessity for their structural complexity.

Heretofore, the deposition of preformed films upon frames in order to produce sealed surfaces and the like, has been known. A representative example of this technique will be found in Demke U.S. Pat. No. 3,154,435, which deals with the formation of a membrane faced acoustical tile. Similar techniques have been employed in the packaging method generally known as "bubble coating" wherein an article to be packaged is placed upon a base, usually a coardboard base, which is either somewhat permeable to the passage of air or has a plurality of pinholes therein. A plastic film, usually a polyethylene film, is soften and laid over the device to be packaged and the backing card and a vacuum applied to the back of the card, whereby the device is substantially envelope in the plastic, which also adheres to the card.

Heretofore, however, it has not been possible to coat low softening point plastics, such as polyethylene with a reflective coating. The reason for this is believed to be that in the first place vacuum coating requires somewhat elevated temperatures at which film such as polyethylene cannot be held under tension, a requirement for even coating, and secondly even if this were possible, there is a danger that under these conditions the plasticizer in the film would outgas in such a manner as to form bubble imperfections in the metalized film.

SUMMARY OF THE INVENTION

There is provided a novel type of mirror comprising a frame constructed of one or more frame members, said frame members having an upper edge, said upper edge of all of said frame members lying in a common plane, and a heat shrinkable plastic film rigidly stretched over said edges and adhered to said frame by means of an adhesive layer between said film and said frame. While it is the principal objective of the present application, that the plastic film be provided with a reflective surface, the invention is not limited thereto. The upper surface may be coasted with a reflective surface, it may be decorated in any suitable manner or it may comprise both a reflective and decorative surface in order to provide a desired esthetic effect.

A portion of the aforementioned reflective surface may be either concave or convex.

In the process of manufacturing the novel mirrors of the present invention, an adhesive layer is placed upon the outer surface of the aforementioned rigid frame, and the plastic film, reflective surface upper most, is placed over the edges on the top of the frame, placed under moderate tension, and caused to adhere to the adhesive layer. While not limiting the invention thereto, it has been found suitable to employ adhesives of the type commonly known in the trade as "contact cements" since these cements provide good adhesion upon mutual contact with the surfaces which it is desired to adhere together and furthermore, these cements are sufficiently heat resistant for the purposes of the present invention.

While such initial tensioning does provide a reasonably good reflective surface, the quality thereof is not satisfactory for commercial purposes.

Not all film forming plastics are suitable for the process of the present invention. The invention is limited to the use of those plastics whose films shrink upon the application of heat. This is contrary to the property of many plastic films which expand upon the application of heat.

The thus produced plastic coated frame is then subjected for a brief exposure to fairly elevated temperatures, during which exposure the film shrinks sufficiently to produce a drum like surface in that portion of the film defined by the edges on the upper surface of the frame. It has been found that under ambient conditions the thus formed stretched film, not only does not beocme slack, but has sufficient memory that, if pressed out of shape by, for example, accidental contact with a hand of similar non-cutting object, the film will return to it former reflecting position without deterioration of the quality of the reflection.

An advantage of the present invention is to enable production of an inexpensive mirror using a reflective plastic film.

BRIEF DESCRIPTION OF THE DRAWINGS

The various features of the present invention may be best understood when considered together with the accompanying drawings in which.

DETAILED DESCRIPTION OF THE INVENTION

During the discussion of the embodiments it will be appreciated that like numbers may refer to the like elements in the different drawings.

Figure 1:
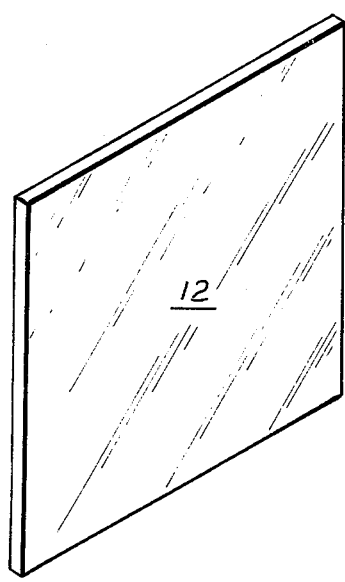
FIG. 1 is a perspective view of the heat shrink, plastic film mirror according to a preferred embodiment of the invention.

A square plastic film mirror according to a preferred embodiment of the present invention is illustrated in FIG. 1. The mirror 10 is shown to include a front reflective surface 12 which preferrably comprises a heat shrunk, metalized Mylar film. FIG. 1 shows the front surface to be relatively square in shape but it will be understood in reference to FIGS. 8,9 and 10 that the configuration of the front surface can be one of a variety of conventional geometric forms. As seen from the perspective of FIG. 1 the film 12 is stretched tightly over a frame 14 which is not visible in this view because it is covered by the film.

Figure 2:
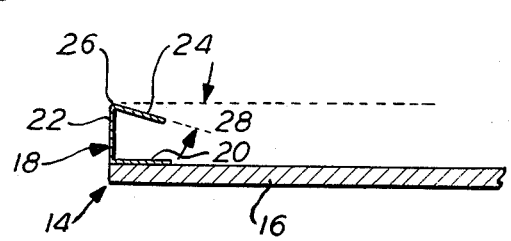
FIG. 2 is a cross sectional view of the frame of the plastic film mirror showing the uppersection in its untensioned state.
Figure 3:
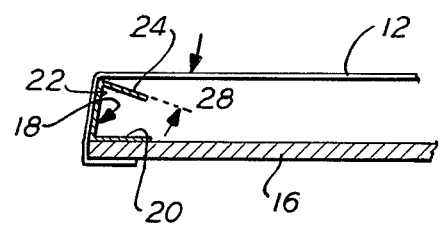
FIG. 3 is a cross sectional view of the mirror of FIG. 1 showing the uppersection in its tensioned state.

A cross sectional view of a portion of the frame 14 is shown in FIG. 2. In this particular view the film has not yet been placed over the frame. The frame comprises a flat baseboard section 16 typically made of fiberboard or the like, and a channel-like frame member 18 including a foot section 20, a sidewall 22 and an inwardly directed rim 24. Foot section 20 is securely attached to baseboard 16 and forms a rigid base section therewith. Foot 20 may be attached to the section 16 either by means of adhesive or through the use of conventional mechanical fasteners or the like. The sidewall section 22 and the inwardly directed rim 24 form a resilient upper section which has the capability of bending inwardly toward the center of the mirror, i.e., in the direction towards which the rim 24 points. An edge 26 is formed at the point where the plane of the rim 24 and the plane of the sidewall 22 coincide. According to a preferred embodiment of the invention the frame member 18 is made out of any suitable resilient metal but it will be understood that many plastic materials would also be suitable. FIG. 3 shows in slightly exaggerated detail the effect upon sidewall 22 of tensioning the film by means of heat shrinking. It will be noted that the film 12 covers the surface of the mirror, the sidewall section 22 and a portion of the bottom of base section 16.

The method of manufacturing the mirror 10 as illustrated in FIG. 1 through 3 is performed in a few basic steps. The first step involves the fabrication of the frame as generally illustrated in FIG. 2. The fabrication of the frame involves the secureing of a frame member 18 to a board section 16. It is understood that according to a preferred embodiment a frame member 18 completely surrounds the periphery of the frame. Therefore if the frame is a square twelve inches on each side, then four frame members slightly less than twelve inches long are used to make the frame. Once the frame is formed the, reflective, heat shrinkable, metalized, Mylar film is placed over the frame reflective side outward so that the film 12 covers the frame and may be attached to the back of the baseboard 16 by an adhesive means or a conventional mechanical means. Preferably the adhesive comprises a contact cement. In this fashion the film completely surrounds the frame members and is preferably attached to the back of the baseboard 16 in such a fashion that the surface of the mirror is flat.

Figure 11:
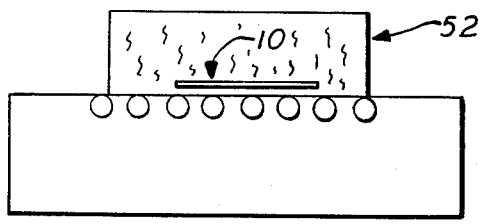
FIG. 11 illustrates the step of tensioning the frame by subjecting the film to the heat of a heat tunnel.

At this point the film is ready for shrinking. In a typical application the thickness of the reflective film varies from about 0.001 inch to 0.003 inch. Once the film 12 is secured to the frame 14 it is then subjected to a temperature of approximately 450° F. for about 1 minute time of exposure. The heating process typically takes place in a conventional shrink tunnel 52 of the sort illustrated generally in FIG. 11.

FIG. 3 illustrates in an exaggerated fashion the effects of heat shrinking film 12. As the film 12 is heated it tends to shrink along its longitudinal and/or its horizontal axis thereby tending to draw the side wall 22 slightly inward. As the sidewall 22 is drawn inward from its equilibrium position as shown in FIG. 2 towards its final position as shown in FIG. 3, there is a tendency for the sidewall to restore itself to the original equilibrium position shown in FIG. 2. This latent restoring force equally applied on all sides of the frame film tends to keep the surface of the film tight and relatively free of distortion from say and ripple. In this manner the tension of the film is automatically self-adjusting because as the film stretches the resilient sidewall takes up the slack but as the film shrinks the side wall 22 is drawn inwardly with it. This is especially important in areas of high heat and humidity because under such conditions the film may expand. Additionally as the film ages it may tend to stretch or flow. If it were not for the self adjusting feature of the frame, the stretching of the film would cause sagging and other undesirable distortions. On the other hand if there were no means for taking up the tension in the film, i.e., if the film were to contract, it might rip.

It will be noted from FIG. 2 that the rim 24 is inclined downwardly at an angle 28 toward the base 16. The angle 28 is defined as the angle subtended by the plane of rim 24 intersecting with the plane of the base 16. It can also be more preferably defined as the angle subtended between the plane of the rim 24 and the plane defined by the periphery of the edges 26 of the frame members 18. It is clear that the edges 26 define a flat plane surface. In practice angle 28 is typically in excess of 2°. The inportance of angle 28 lies in the fact that rim 24 must stay out of the way of the plane of film 12 so that it does not show through the surface of the film as undesirable distortion. However in some contexts it may not be necessary to have rim 24 at all, but it is helpful for a variety of reasons. The principal reason that rim 24 is helpful is that it prevents edge 26 from becoming too sharp. If edge 26 were a discontinuous rim it could easily cut the material of film 12, but since edge 26 is formed by bending the resilient material the resulting edge is relatively smooth and continuous.

Figure 5:
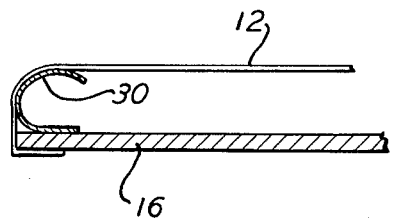
FIG. 5 is a cross sectional view of another embodiment of present invention in which a portion of the frame has a U-shape.

Another important feature of the present invention is the fact that edge 26 is well defined and continuous at the same time. It is important that edge 26 be well defined because when the mirrors are placed edge to edge, as they might be in the context of a ceiling mirror, it is undesirable for there to be great discontinuities between the edges 26 of adjoining mirrors 10. It is also found that gradually rounded edges such as those illustrated in FIG. 5 are not as satisfactory as the sharper edges, because the rounded edges emphasize the discontinuity when two or more mirrors abut one another. Nevertheless a curved frame member may be more desirable under certain special circumstances.

Figure 4:
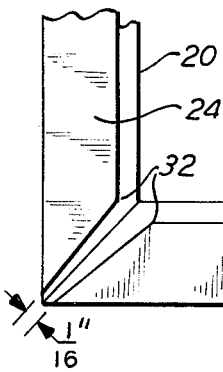
FIG. 4 is a plan view of the corner of the mirror frame with the plastic mirror surface removed.

One problem encountered in the manufacture of plastic film mirrors of the rectangular variety is that when the frame members are tensioned the ends of the frame members may mutually interfere as they are bent inwardly. To solve this problem the ends 32 are mitered and set apart about one-sixteenth of an inch. Additionally the angle of mitering may be slightly less than 45° with respect to the rim so that as the resilient upper sections bend inwardly under the tensioning of the plastic film the rim sections 24 will not interfere with one another. The spacing of the end section 32 and the mitering of the rim 24 is illustrated in FIG. 4.

Figure 6:
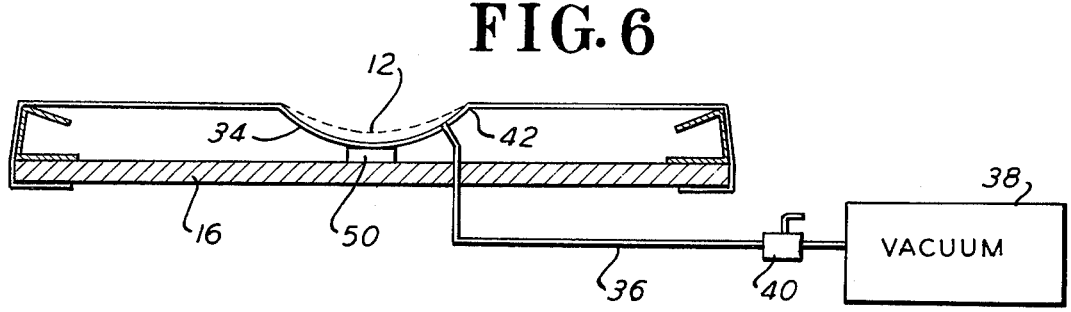
FIG. 6 is another embodiment of the present invention in which a vacuum source is used to distort a portion of the mirror into a concave shape.

According to another embodiment of the present invention a slightly depressed dish is placed behind the reflecting surface of the film in the manner shown in FIG. 6. The dish 34 is connected by airline 36 to a vacuum source 38. A selective means 40 is connected between source 38 and dish 34 for controlling the application of vacuum thereto. According to a preferred embodiment the means may be a valve but it is understood that any conventional means for controlling the output of vacuum source 38 may be employed. In operation the vacuum in vacuum source 38 is applied by means 40 to the air hose 36 directly to the interior of dish 34. The vacuum draws the plastic film up against lip 42 in a substantially air tight fashion. Alternatively an air tight seal could be made between the lip 42 and the film 12 but that this is undersirable because it interferes with the tensioning of the frame members and distorts the mirror unnecessarily. When the dish is evacuated the film 12 is drawn smoothly and continuously into the chamber formed between the dish 34 and the film 12. This causes a concave depression in the surface of the mirror. A concave depression may be desirable for a variety of reasons. Such a device may find application in the cosmetic or scientific areas. It should be stressed however that the general concept of distorting a reflective surface with a vacuum is not new. However the application of this technique to a heat shrunken, reflective, Mylar surface mirror appears to be totally novel.

Figure 7:
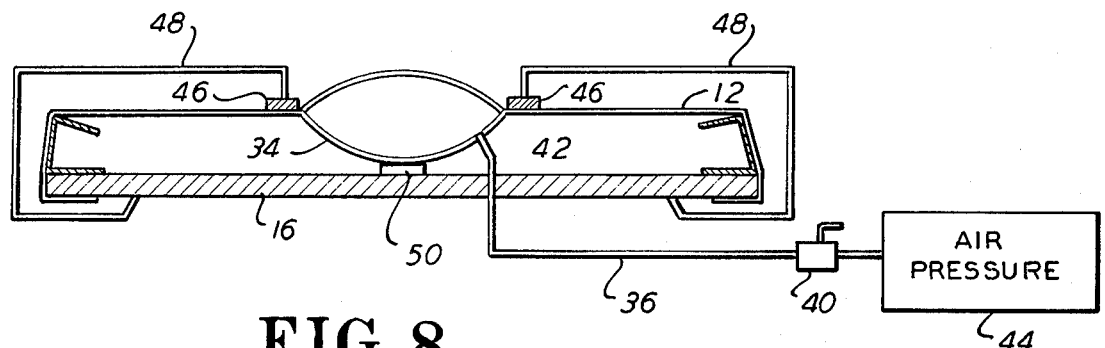
FIG. 7 is another embodiment of the present invention in which a pressurized source is used to distort a portion of the surface of the mirror into a convexed shape.

Alternatively a similar technique can be employed to create a convexed distortion of the film surface as shown in FIG. 7. Where convex distortion is desired a source of air pressure higher than ambient 44 replaces vacuum 38. High pressure source 44 is connected to the selective means 40 through air hose 36 and to dish 34 in the manner previously described with reference to FIG. 6. Since it is undersirable to permanently attach the rim of the dish to the Mylar film it is, therefore, necessary to force the film 12 into contact with the rim of the dish 42 by some external agency. In this case an annular ring 46 as shown in cross section in FIG. 7 is held rigidly against the rim 42 of the dish 34. Ring 46 is located on the reflective side of the mirror and is preferrably held firmly against the film 12 by a set of braces 48 which find support from the base 16 of the mirror. Of course, the annular ring 46 could be held firmly against the film and the lip 42 by other means. It is only necessary that the film be held against the lip of the dish in a secure fashion. It will be further appreciated in FIGS. 6 and 7 that the dish 34 is rigidly connected to the base of the mirror 16 by a mounting block 50 or similar equivalent. In operation the pressure from source 44 is applied to the interior of the dish 34 by means 40 and air line 36. As the chamber formed between film 12 and dish 34 fills with air the film 12 trapped in the interior of ring 46 will bubble outwardly relative to the plane of the film outside of ring 46. This in turn causes a conven distortion of that portion of the reflective surface bounded by annular ring 46. Such a distortion is relatively smooth and has many desirable optical qualities. For instance such an application may find considerable use as a shaving mirror or the like.

With reference to the frame members it will be appreciated that the foot 20 and the sidewall 22 have an L-shaped relationship to one another in that sidewall 22 is substantially perpendicular to foot 20. As previously discussed, rim 24 tends to have a slightly V-shape with respect to sidewall 22. In short, the shape of the frame member 18 can be described as an L with a V-top, wherein one leg of the "L" and one leg of the "V" is the common sidewall 22.

Theoretically it is possible to achieve tensioning of the film by mechanically stretching the reflective film prior to fastening it to the frame. Unfortunately, it is difficult to achieve uniform tensioning in this manner and, therefore, ripples and sagging fequently accompanies mirrors made by mechanical stretching. Heat shrinking is the preferred method of tensioning because it produces a higher quality reflective surface due to its uniform shrinking characteristics.

Figure 8:
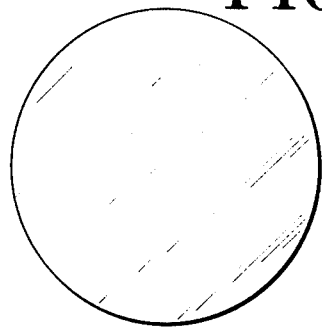
FIG. 8 is an elevated view of a mirror of the present invention in which the mirror is generally circular in shape.
Figure 9:
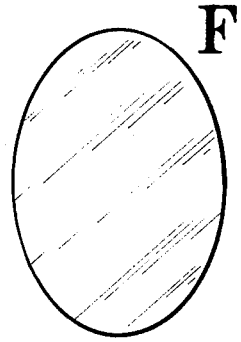
FIG. 9 is an elevated view of a mirror of the present invention in which the mirror is generally oval in shape.
Figure 10:
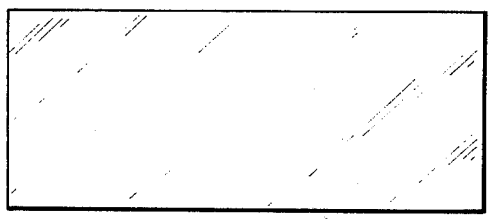
FIG. 10 is an elevated view of a mirror of the present invention in which the shape is generally rectangular.

Several modifications of the present invention may be possible within the scope of the described invention. In particular it could be possible to fabricate a substantially circular or round mirror as shown in FIG. 8 or to fabricate a substantially oval or non round mirror as shown in FIG. 9. While FIG. 1 shows a preferred embodiment to be in the shape of a square it will be apparent to those of ordinary skill in the art that any rectangular shape can be fabricated in the method described. See FIG. 10. As a matter of fact it is anticipated that such mirrors will find more utility in a non square, rectangular configuration than in the simple case of the square configuration.

Figure 12:
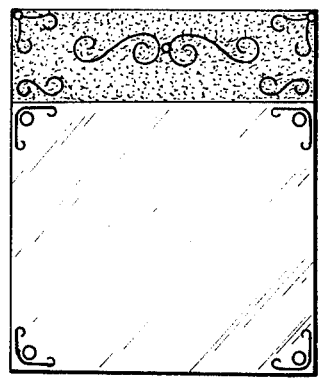
FIG. 12 is an elevated view of the mirror of the present invention in which the surface is only partially reflective and in which the rest of the surface is decorated with a nonreflective decoration.

Additionally there may be produced mirrors according to the teaching of the present invention in which a portion of the reflective surface is decorated with either reflective or nonreflective or partially reflective decorations. Such variation is shown in FIG. 12 in which the surface of the mirror is both partially reflective and partially decorated.

In a general manner, while there has been disclosed defective and efficient embodiments of the invention, it should be well understood that the invention is not limited to such embodiments as there might be changes made in the arrangement, disposition, and form of the parts without departing from the principal of the present invention as comprehended within the scope of the accompanying claims.

We claim:

1. A plastic film mirror having a definable periphery and an interior comprising:
   a frame having a rigid base section and a resilient upstanding upper section connected thereto capable of bending inwardly from an equilibrium position toward the interior of said mirror;
   securing means attached to at least a portion of said frame; and,
   a metalized, metalized, plastic film securely attached to said frame by said securing means, said film covering at least a portion of the area bounded by the periphery of said upstanding upper resilient section and being held in constant, uniform tension by the resilience of said resilient upstanding upper section of said frame, said film forming a primary reflective surface of said mirror which is generally rectangular in shape,
   said resilient upstanding upper section including a plurality of substantially straight frame members each having a foot, a sidewall section substantially perpendicular to and connected at one edge thereof to said foot; and an inwardly directed rim connected to said sidewall section at the edge farthest removed from the edge connected to said foot, said rim being inclined downwardly from the edge of said sidewall toward said base section, said frame further including a plurality of corners formed where the ends of said frame members are in closest proximity to each other, said corners being formed in such a manner that there is a sufficient gap between the sidewalls of adjacent frame members so that said sidewall section and said rim of said frame members can bend inwardly under the tension of said film without hindering each other.

2. The plastic film mirror of claim 1 wherein said rim is inclined downwardly and inwardly from the edge of said sidewall at an acute angle with respect to the plane of said base section of not less than 2°.

3. A plastic film mirror having a definable periphery and an interior, comprising:
   a frame having a rigid base section and a resilient upstanding upper section connected thereto capable of bending inwardly from an equilibrium position toward the interior of said mirror;
   securing means attached to at least a portion of said frame; and,
   a reflective, metalized, plastic film, securely attached to said frame by said securing means, said film partially covering at least the area bounded by the periphery of said upstanding upper resilient section and being held in constant, uniform tension by the resilience of said resilient upstanding upper section of said frame, said resilient upstanding upper section including at least three frame members, each having two ends and comprising respectively:
   a foot section;
   a sidewall section having a first and second edge; and,
   a rim section;
   wherein the first edge of said sidewall section is connected to said foot section and forms an L-shaped configuration therewith, and the second edge of said sidewall section is connected to said rim section and forms a V-shaped configuration therewith, the acute angle of intersection of the extended plane of said foot section and said rim section being not less than 2°, said frame further including a plurality of corners formed where the ends of said frame members are in closest proximity to each other, said corners being formed in such a manner that there is a sufficient gap between the sidewalls of adjacent frame members so that said sidewall section and said rim can bend inwardly under the tension of said film without hindering each other.

4. A plastic film mirror having a definable periphery and an interior, comprising:
   a frame having a rigid base section and a resilient metal upstanding upper section connected thereto capable of bending inwardly from an equilibrium position toward the interior of said mirror, said resilient metal upstanding upper section including a plurality of frame members each including:
   a foot fixed to one side of said rigid base section;
   a sidewall section connected thereto; and,
   an inwardly directed rim connected to said sidewall section, said rim being inclined downwardly toward the base section;
   securing means attached to at least a portion of said frame; and,
   an at least partially reflective, metalized, plastic film securely attached to said frame by said securing means, said film substantially completely covering said resilient metal upstanding upper section and said one side of said rigid base section and being held in constant, uniform tension substantially solely by the resilience of the metal in said resilient metal upstanding upper section of said frame.

5. The plastic film mirror of claim 4 wherein said securing means includes an adhesive medium.

6. The plastic film mirror of claim 5 wherein said a adhesive medium comprises a contact cement.

7. The plastic film mirror of claim 4 wherein the plastic film material is a polyester.

8. The plastic film mirror of claim 4 wherein the primary reflective surface of said mirror is generally circular in shape.

9. The plastic film mirror of claim 4 wherein the primary reflective surface of said mirror is generally oval in shape.

10. The plastic film mirror of claim 4 wherein the primary reflective surface of said mirror is generally rectangular in shape.

11. The plastic film mirror of claim 4 wherein said frame members have a generally U-shaped cross section.

12. The plastic film mirror of claim 4 wherein said base section includes a flat board base.

13. The plastic film mirror of claim 4 wherein only a portion of said plastic film is reflective.

14. The plastic film mirror of claim 4 wherein a portion of said film is decorated.

15. The plastic film mirror of claim 4 wherein said film is a heat shrunk plastic film.

16. The plastic film mirror of claim 4 wherein said mirror further includes a means for altering the radius of the curvature of a portion of said reflective film, said means comprising:
- an airtight chamber at least part of whose surface comprises said film;
- an atmosphere modifying means operatively connected to said chamber; and,
- a means for selectively controlling said atmosphere modifying means.

17. The plastic film mirror of claim 16 wherein said atmosphere modifying means is a vacuum source.

18. The plastic film mirror of claim 16 wherein said atmosphere modifying means is a source of positive pressure greater than ambient atmospheric pressure.

19. The plastic film mirror of claim 16 wherein said airtight chamber includes a means having a depression therein, said means having a continuous, generally circular lip, therearound; and,
- wherein said film covers the lip area and forms an airtight seal therewith, thereby rendering said chamber virtually airtight.

20. The plastic film mirror of claim 16 wherein said airtight chamber includes a means having a depression therein, said means having a continuous, generally oval lip, therearound; and,
- wherein said film covers said lip and forms an airtight seal therewith, thereby rendering said chamber virtually airtight.

* * * * *